(12) United States Patent
Hein et al.

(10) Patent No.: US 8,759,428 B2
(45) Date of Patent: Jun. 24, 2014

(54) POLYCARBONATE COMPOSITIONS

(75) Inventors: Christopher L. Hein, Evansville, IN (US); Cristina Cojocariu, Evansville, IN (US); Mohd S. Salleh, Tochigi (JP)

(73) Assignee: Sabic Innovative Plastics IP B.V. (NL)

( * ) Notice: Subject to any disclaimer, the term of this patent is extended or adjusted under 35 U.S.C. 154(b) by 1688 days.

(21) Appl. No.: 11/843,076

(22) Filed: Aug. 22, 2007

(65) Prior Publication Data

US 2009/0054586 A1  Feb. 26, 2009

(51) Int. Cl.
*C08K 5/1545* (2006.01)
*C08K 5/1575* (2006.01)
*C08K 5/10* (2006.01)
*C08K 5/315* (2006.01)
*C09K 11/06* (2006.01)

(52) U.S. Cl.
USPC ............... 524/109; 524/110; 524/237

(58) Field of Classification Search
USPC .......................... 524/109, 110, 237
See application file for complete search history.

(56) References Cited

U.S. PATENT DOCUMENTS

| | | | |
|---|---|---|---|
| 4,379,721 A | | 4/1983 | Qualitz et al. |
| 4,588,807 A | * | 5/1986 | Scholl et al. ............ 528/272 |
| 5,783,307 A | | 7/1998 | Fagerburg et al. |
| 5,869,554 A | | 2/1999 | Pickett et al. |
| 6,204,309 B1 | | 3/2001 | Misiak et al. |
| 6,441,071 B1 | * | 8/2002 | Van Nuffel ............ 524/316 |
| 6,462,168 B1 | | 10/2002 | Siclovan et al. |
| 2006/0131761 A1 | | 6/2006 | Chauhan et al. |

FOREIGN PATENT DOCUMENTS

| | | |
|---|---|---|
| EP | 0 900 823 B1 | 6/2004 |
| JP | 2003-19867 A | 1/2003 |
| JP | 2005060398 A | 3/2005 |
| JP | 2006083230 A | 3/2006 |
| JP | 2006249157 A | 9/2006 |
| JP | 2007106943 A | 4/2007 |
| JP | 2008524219 A | 7/2008 |
| WO | WO2006065561 A2 | 6/2006 |

OTHER PUBLICATIONS

PCT International Search Report for International Application No. PCT/US2008/073260, 2009.
BASF: "Uvinul 3030: Technical information". Internet Article, [Online], Jun. 1999, pp. 1-5, XP002506879. Retrieved from the Internet: URL:http://www2.basf.us/businesses/coatcol or /plastics/pdfs/3030/pdf>.
Clariant: "Hostavin B-CAP". Internet Article, [Online], Jan. 2006, pp. 1-8, XP002506884. Retrieved from the Internet: URL:http://pa.clariant.com/pa/e2wtools.nsf/lookupDownloads/DA3322E_0106_BR_HostavinB-CAP.pdf/$FILE/DA3322E_0106_BR_HostavinB-CAP.pdf>.
Ciba® TINUVIN® 234 Low volatile Benzotriazole UV Absorber (2 pgs.).
Hostavin® B-CAP®, Pigments & Additives Division, Plastic Business, Jan. 2006/K 322 GB, (8 pgs.).
Uvinul® light stabilizers, EVP 004605 e, Apr. 2005, (11 pgs.).

* cited by examiner

*Primary Examiner* — Tae H Yoon
(74) *Attorney, Agent, or Firm* — Cantor Colburn LLP

(57) ABSTRACT

A polycarbonate composition is disclosed comprising a polycarbonate resin, a 3-hydroxychromone dye, and an ultraviolet absorber selected from the group consisting of cyanoacrylates, malonates, and oxanilides. The combination of the 3-hydroxychromone dye and ultraviolet absorber results in a composition with good color retention and strong initial fluorescent emission intensity.

30 Claims, 1 Drawing Sheet

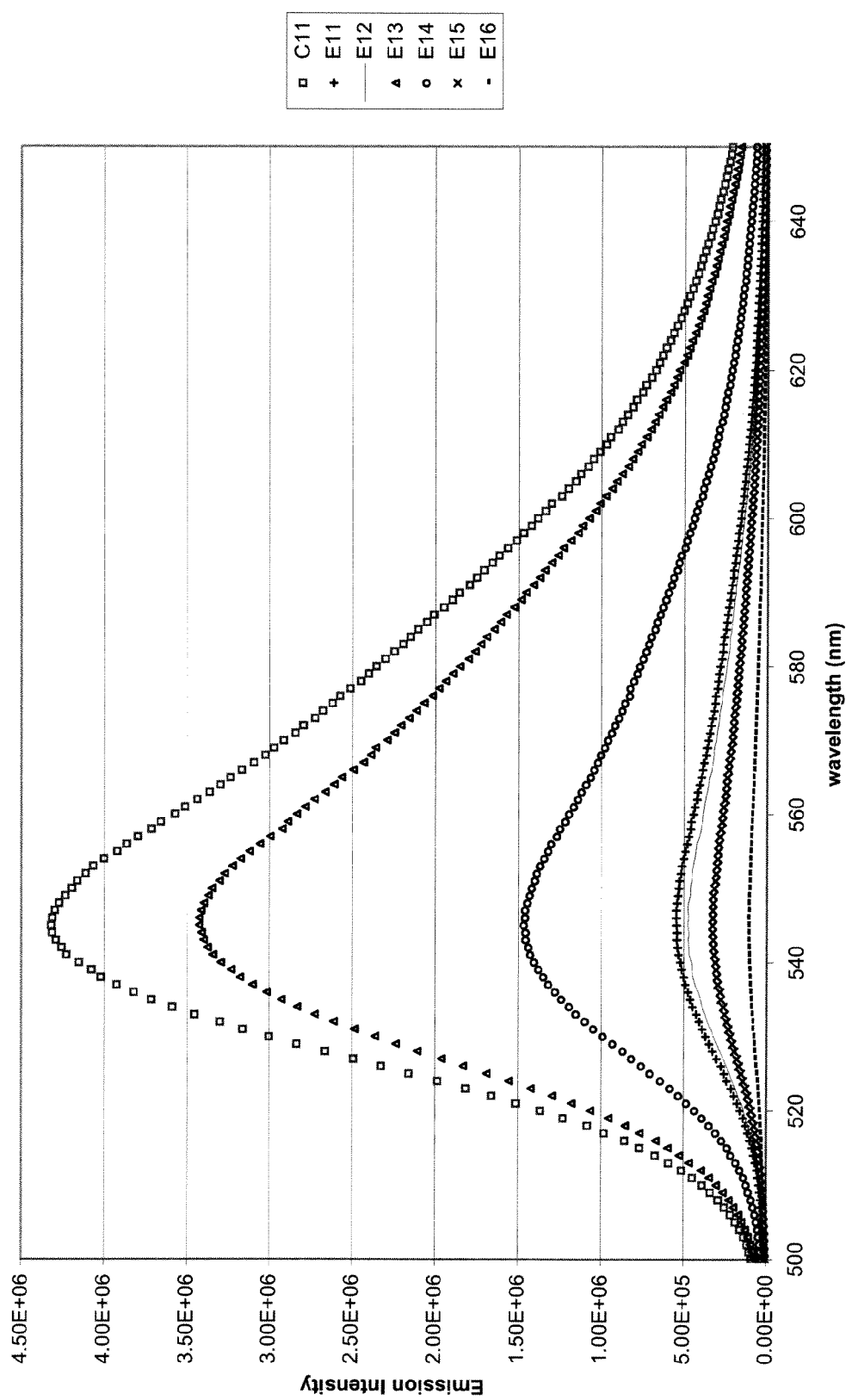

POLYCARBONATE COMPOSITIONS

BACKGROUND

The present disclosure generally relates to a polycarbonate composition. The polycarbonate composition contains a covert additive which becomes visible upon application of ultraviolet radiation ("UV"). Also disclosed are methods for preparing and using the same.

Fluorescent dyes are commonly used as colorants for the coloration of polymers. They are also used to enhance or change color for design or safety purposes. Fluorescent dyes are soluble under processing conditions and are preferably completely dissolved, leaving no color streaks, little or no haze, etc. in the fabricated product. They also preferably exhibit good lightfastness and heat stability and are resistant to migration or sublimation.

Fluorescent molecules absorb light at one wavelength and emit light at another, longer wavelength. When fluorescent molecules absorb a photon of a specific wavelength, an electron in a given orbital rises to a higher energy level (the excited) state. Electrons in this state are unstable and will return to the ground state, releasing energy in the form of light and heat. This emission of energy in the form of light is fluorescence. Because some energy is lost as heat, the emitted light contains less energy and therefore has a longer wavelength than the absorbed (or excitation) light. The notable shift between excitation stimulus and emitted light is called Stokes shift. The Stokes shift is typically considered long when it exceeds 50 nm.

Some fluorescent dyes are also useful for authentication as a covert additive. In such a usage, the fluorescent dyes are invisible under typical lighting conditions, yet brightly colored when illuminated with ultraviolet light.

3-hydroxychromone dyes range in color from green to orange. Some can be used in engineering thermoplastic polymers, such as polycarbonates, if their thermal stability is adequate. However, 3-hydroxychromones dyes are generally reported to possess poor lightfastness such that over a short period of time, the compound photodegrades resulting in a loss of fluorescence.

3-hydroxychromone dyes are known in the art; see e.g. U.S. Pat. Pub. 2006/0131761 entitled "COMPOSITION, METHOD OF AUTHENTICATING, METHODS OF MAKING AUTHENTICATABLE COMPOSITIONS, AUTHENTICATABLE ARTICLES MADE THERE FROM", which is fully incorporated herein by reference. They are a subset of dyes having the general structure shown below:

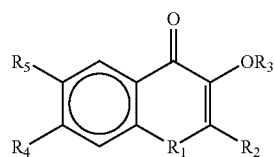

wherein $R_1$ is one of —O— or —$NR_6$—;

$R_2$ is selected from the group consisting of an aromatic radical having 3 to 30 carbon atoms, and a cycloaliphatic radical having 3 to 12 carbon atoms;

$R_3$ is hydrogen or a labile group with the proviso that $R_3$ is not a group selected from the group consisting of —$CH_2$—($CH_2$)$_n$—$CH_3$ and —$CH_2$—$C_6H_5$ wherein n has a value 0, 1, or 2;

$R_4$ and $R_5$ are either:

(i) independently selected from the group consisting of an aliphatic radical having 1 to 12 carbon atoms, an aromatic radical having 3 to 20 carbon atoms, a cycloaliphatic radical having 3 to 12 carbon atoms, a cyano group, a nitro group, a halo group, and a —$OR_7$ group, wherein $R_7$ is selected from the group consisting of hydrogen, an aliphatic radical having 1 to 12 carbon atoms, an aromatic radical having 3 to 20 carbon atoms, and a cycloaliphatic radical having 3 to 12 carbon atoms; or (ii) together represent an aromatic radical having 3 to 12 carbon atoms, a heteroaromatic radical having 3 to 12 carbon atoms, or a pyranone radical of the formula

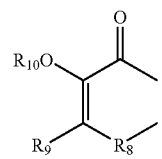

wherein $R_8$ is selected from the same options as $R_1$, $R_9$ is selected from the same options as $R_2$, and $R_{10}$ is selected from the same options as $R_3$; and $R_6$ is selected from the group consisting of hydrogen, an aliphatic radical having 1 to 12 carbon atoms, an aromatic radical having 3 to 20 carbon atoms, and a cycloaliphatic radical having 3 to 12 carbon atoms.

When $R_1$ is —O—, the structure is a 3-hydroxychromone. Hydroxy chromones typically have Stokes shifts greater than 100 nm, which are very long.

Some dyes in this class exhibit a color shift from a clear color to a visible color after exposure to UV radiation for a short period of time. This color shift occurs within several hours when exposed to both sunlight and xenon arc. The color shift is irreversible and the once covert additive is now visible to the viewer. Interestingly, this color shift only affects the color of the dye when viewed under typical lighting conditions; when stimulated with ultraviolet light, it still fluoresces, though with continued exposure fluorescence emission diminishes. While poor lightfastness is known for 3-hydroxychromone dyes, it is not generally associated with rapid photoyellowing (the creation of an absorbing chromophore).

One such dye which exhibits this color shift is BP-3-HF, a 3-hydroxychromone dye having the following formula:

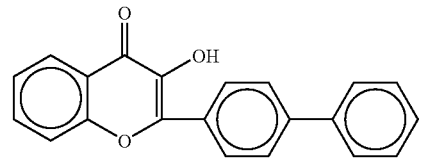

BP-3-HF shifts from a clear color to a dark yellow-orange color after exposure to UV radiation for a short period of time. BP-3-HF is also known as 3-hydroxy-2-(4-biphenyl)-chromen-4-one.

Another such dye which exhibits this color shift is D-3-HF, a dye having the following formula:

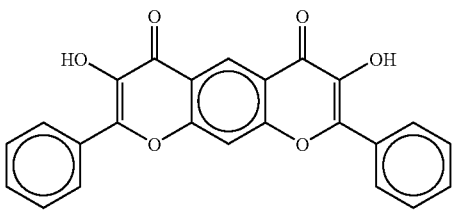

D-3-HF shifts from a clear color to an amber color after exposure to UV radiation. D-3-HF is also known as 3,7-dihydroxy-2,8-diphenyl-4H, 6H-pyrano[3,2-g]chromene-4,6-dione.

Products are generally expected to retain their initial color when properly used. Because polycarbonates containing such dyes rapidly develop color upon UV absorption, and because the change in the color due to the color shift far exceeds the change in color due to resin photochemical degradation, commercial use of such dyes is highly constrained. Indeed, short-term exposure to sunlight during shipping/handling or to sunlight transmitted through window glass will likely provide sufficient energy to initiate photoyellowing.

It would be desirable to find a composition which allows for the use of such dyes, but provides good color retention and permits strong initial fluorescence emission intensity.

BRIEF DESCRIPTION

Disclosed, in various embodiments, are polycarbonate compositions containing 3-hydroxychromone dyes, and their derivatives, which have good color retention and strong initial fluorescence. Also disclosed are processes for producing and/or using the same.

In the embodiments, the polycarbonate composition comprises:
a polycarbonate resin;
an ultraviolet absorber selected from the group consisting of cyanoacrylates, malonates, and oxanilides; and
a dye of Formula (I):

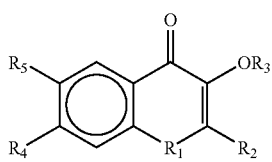

Formula (I)

wherein $R_4$ and $R_5$ are either:
(i) independently selected from the group consisting of an aliphatic radical having 1 to 12 carbon atoms, an aromatic radical having 3 to 20 carbon atoms, a cycloaliphatic radical having 3 to 12 carbon atoms, a cyano group, a nitro group, a halo group, and a —$OR_7$ group, wherein $R_7$ is selected from the group consisting of hydrogen, an aliphatic radical having 1 to 12 carbon atoms, an aromatic radical having 3 to 20 carbon atoms, and a cycloaliphatic radical having 3 to 12 carbon atoms; or
(ii) together represent an aromatic radical having 3 to 12 carbon atoms, a heteroaromatic radical having 3 to 12 carbon atoms, or a pyranone radical of the formula

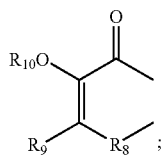

$R_1$ and $R_8$ are independently selected from —O— or —$NR_6$—;
$R_2$ and $R_9$ are independently selected from the group consisting of an aromatic radical having 3 to 30 carbon atoms, and a cycloaliphatic radical having 3 to 12 carbon atoms;
$R_3$ and $R_{10}$ are independently selected from hydrogen or a labile group with the proviso that $R_3$ is not a group selected from the group consisting of —$CH_2$—$(CH_2)_n$—$CH_3$ and —$CH_2$—$C_6H_5$ wherein n has a value 0, 1, or 2; and
$R_6$ is selected from the group consisting of hydrogen, an aliphatic radical having 1 to 12 carbon atoms, an aromatic radical having 3 to 20 carbon atoms, and a cycloaliphatic radical having 3 to 12 carbon atoms.

The dye may be BP-3-HF, having the formula:

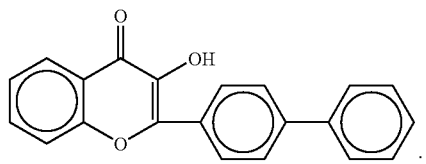

The dye may be D-3-HF, having the formula:

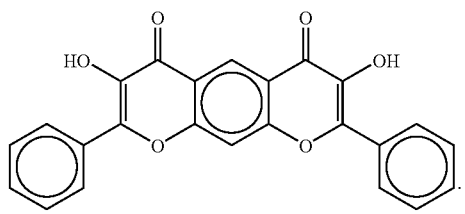

The dye may be present in the amount of about 0.001 phr to about 0.05 phr.

The ultraviolet absorber may be tetraethyl-2,2'-(1,4-phenylene-dimethylidene)-bismalonate or 1,3-bis-[(2'-cyano-3',3'-diphenylacryloyl)oxy]-2,2-bis-{[(2'-cyano-3',3'-diphenylacryloyl)oxy]methyl}-propane.

The ultraviolet absorber may be present in the amount of about from 0.1 phr to about 5.0 phr.

A 0.125 inch plaque of the composition may have an initial fluorescence emission intensity of $10^6$ or greater.

The composition may have a total color shift dE* of less than 1.2 after 100 hours exposure, according to a modified ASTM D4459 protocol as described herein.

The composition may have a total color shift dE* of less than 1.2 after 300 hours exposure, according to ASTM G26.

The composition may have an initial fluorescence emission intensity of $10^6$ or greater, and a total color shift dE* of about 1.2 or less after 300 hours exposure according to ASTM G26.

The polycarbonate resin may be a homopolymer or a blend of polycarbonate homopolymers.

The composition may have a light transmittance of 10% or greater at a thickness of 3.2 mm, according to ASTM D1003.

The composition may have a haze of 5% or less at a thickness of 3.2 mm, according to ASTM D1003.

In further embodiments, the polycarbonate composition comprises:
  a polycarbonate resin;
  an ultraviolet absorber selected from the group consisting of cyanoacrylates, malonates, and oxanilides; and
  a dye of Formula (I):

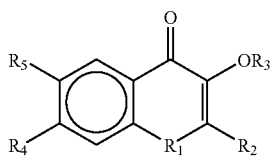

Formula (I)

wherein $R_4$ and $R_5$ are either:
  (i) independently selected from the group consisting of an aliphatic radical having 1 to 12 carbon atoms, an aromatic radical having 3 to 20 carbon atoms, a cycloaliphatic radical having 3 to 12 carbon atoms, a cyano group, a nitro group, a halo group, and a —$OR_7$ group, wherein $R_7$ is selected from the group consisting of hydrogen, an aliphatic radical having 1 to 12 carbon atoms, an aromatic radical having 3 to 20 carbon atoms, and a cycloaliphatic radical having 3 to 12 carbon atoms; or
  (ii) together represent an aromatic radical having 3 to 12 carbon atoms, a heteroaromatic radical having 3 to 12 carbon atoms, or a pyranone radical of the formula

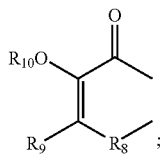

$R_1$ and $R_8$ are independently selected from —O— or —$NR_6$—;
$R_2$ and $R_9$ are independently selected from the group consisting of an aromatic radical having 3 to 30 carbon atoms, and a cycloaliphatic radical having 3 to 12 carbon atoms;
$R_3$ and $R_{10}$ are independently selected from hydrogen or a labile group with the proviso that $R_3$ is not a group selected from the group consisting of —$CH_2$—($CH_2$)$_n$—$CH_3$ and —$CH_2$—$C_6H_5$ wherein n has a value 0, 1, or 2; and
$R_6$ is selected from the group consisting of hydrogen, an aliphatic radical having 1 to 12 carbon atoms, an aromatic radical having 3 to 20 carbon atoms, and a cycloaliphatic radical having 3 to 12 carbon atoms; and
wherein a 0.125 inch plaque of the composition has an initial fluorescence emission intensity greater than $10^6$.

In other embodiments, the polycarbonate composition comprises:
  a polycarbonate resin;
  an ultraviolet absorber selected from the group consisting of cyanoacrylates, malonates, and oxanilides; and
  a dye selected from the group consisting of BP-3-HF and D-3-HF:

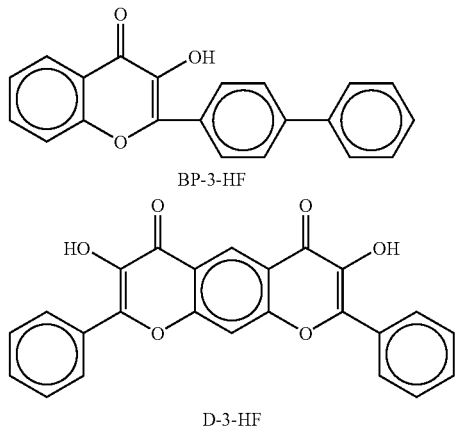

wherein the composition has a total color shift dE* of about 1.2 or less after 300 hours exposure, according to ASTM G26; and
wherein a 0.125 inch plaque of the composition has an initial fluorescence emission intensity greater than $10^6$.

These and other non-limiting characteristics are more particularly described below.

BRIEF DESCRIPTION OF THE DRAWINGS

The following is a brief description of the drawings, which are presented for the purposes of illustrating the exemplary embodiments disclosed herein and not for the purposes of limiting the same.

FIG. 1 is a graph of fluorescent intensity versus wavelength for various compositions disclosed herein.

DETAILED DESCRIPTION

A more complete understanding of the components, processes, and/or properties of the compositions disclosed herein can be obtained by reference to the accompanying drawings. These drawings are merely schematic representations based on convenience and the ease of demonstrating the present disclosure, and are, therefore, not intended to define or limit the scope of the exemplary embodiments.

Although specific terms are used in the following description for the sake of clarity, these terms are intended to refer only to the particular structure of the embodiments selected for reference, and are not intended to define or limit the scope of the disclosure.

Numerical values in the specification and claims of this application, particularly as they relate to polymer compositions, reflect average values for a composition that may contain individual polymers of different characteristics. Furthermore, unless indicated to the contrary, the numerical values should be understood to include numerical values which are the same when reduced to the same number of significant figures and numerical values which differ from the stated value by less than the experimental error of conventional measurement technique of the type described in the present application to determine the value.

The polycarbonate compositions of the present disclosure comprise a polycarbonate resin; a 3-hydroxychromone dye; and an ultraviolet absorber selected from the group consisting of cyanoacrylates, malonates, and oxanilides. It was unexpectedly discovered that the use of these groups of ultraviolet absorbers with such dyes allowed for the combination of good color retention and strong initial fluorescent emission intensity.

The polycarbonate composition comprises a polycarbonate resin. Polycarbonates have several desired properties including clarity or transparency, high impact strength, heat resistance, weather and ozone resistance, good ductility, being combustible but self-extinguishing, good electrical resistance, noncorrosive, nontoxic, etc.

As used herein, the terms "polycarbonate" and "polycarbonate resin" mean compositions having repeating structural carbonate units of the formula (1):

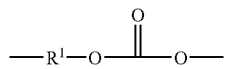
(1)

in which at least 60 percent of the total number of $R^1$ groups are aromatic organic radicals and the balance thereof are aliphatic, alicyclic, or aromatic radicals. In one embodiment, each $R^1$ is an aromatic organic radical, for example a radical of the formula (2):

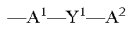
(2)

wherein each of $A^1$ and $A^2$ is a monocyclic divalent aryl radical and $Y^1$ is a bridging radical having one or two atoms that separate $A^1$ from $A^2$. In an exemplary embodiment, one atom separates $A^1$ from $A^2$. Illustrative non-limiting examples of radicals of this type are —O—, —S—, —S(O)—, —S(O)$_2$—, —C(O)—, methylene, cyclohexyl-methylene, 2-[2.2.1]-bicycloheptylidene, ethylidene, isopropylidene, neopentylidene, cyclohexylidene, cyclopentadecylidene, cyclododecylidene, and adamantylidene. The bridging radical $Y^1$ may be a hydrocarbon group or a saturated hydrocarbon group such as methylene, cyclohexylidene, or isopropylidene.

Polycarbonates may be produced by the interfacial reaction of dihydroxy compounds having the formula HO—$R^1$—OH, which includes dihydroxy compounds of formula (3)

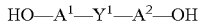
(3)

wherein $Y^1$, $A^1$ and $A^2$ are as described above. Also included are bisphenol compounds of general formula (4):

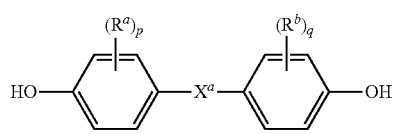
(4)

wherein $R^a$ and $R^b$ each represent a halogen atom or a monovalent hydrocarbon group and may be the same or different; p and q are each independently integers of 0 to 4; and $X^a$ represents one of the groups of formula (5):

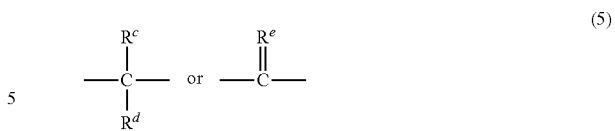
(5)

wherein $R^c$ and $R^d$ each independently represent a hydrogen atom or a monovalent linear or cyclic hydrocarbon group and $R^e$ is a divalent hydrocarbon group.

In an embodiment, a heteroatom-containing cyclic alkylidene group comprises at least one heteroatom with a valency of 2 or greater, and at least two carbon atoms. Heteroatoms for use in the heteroatom-containing cyclic alkylidene group include —O—, —S—, and —N(Z)—, where Z is a substituent group selected from hydrogen, hydroxy, C1-12 alkyl, C1-12 alkoxy, or C1-12 acyl. Where present, the cyclic alkylidene group or heteroatom-containing cyclic alkylidene group may have 3 to 20 atoms, and may be a single saturated or unsaturated ring, or fused polycyclic ring system wherein the fused rings are saturated, unsaturated, or aromatic.

Other bisphenols containing substituted or unsubstituted cyclohexane units can be used, for example bisphenols of formula (6):

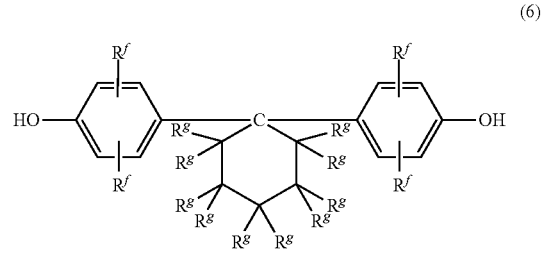
(6)

wherein each $R^f$ is independently hydrogen, $C_{1-12}$ alkyl, or halogen; and each $R^g$ is independently hydrogen or $C_{1-12}$ alkyl. The substituents may be aliphatic or aromatic, straight chain, cyclic, bicyclic, branched, saturated, or unsaturated. Such cyclohexane-containing bisphenols, for example the reaction product of two moles of a phenol with one mole of a hydrogenated isophorone, are useful for making polycarbonate polymers with high glass transition temperatures and high heat distortion temperatures. Cyclohexyl bisphenol containing polycarbonates, or a combination comprising at least one of the foregoing with other bisphenol polycarbonates, are supplied by Bayer Co. under the APEC® trade name.

Other useful dihydroxy compounds having the formula HO—$R^1$—OH include aromatic dihydroxy compounds of formula (7):

(7)

wherein each Rh is independently a halogen atom, a $C_{1-10}$ hydrocarbyl such as a $C_{1-10}$ alkyl group, a halogen substituted $C_{1-10}$ hydrocarbyl such as a halogen-substituted $C_{1-10}$ alkyl group, and n is 0 to 4. The halogen is usually bromine.

Exemplary dihydroxy compounds include the following: 4,4'-dihydroxybiphenyl, 1,6-dihydroxynaphthalene, 2,6-dihydroxynaphthalene, bis(4-hydroxyphenyl)methane, bis(4- hydroxyphenyl)diphenylmethane, bis(4-hydroxyphenyl)-1-naphthylmethane, 1,2-bis(4-hydroxyphenyl)ethane, 1,1-bis(4-hydroxyphenyl)-1-phenylethane, 2-(4-hydroxyphenyl)-2-(3-hydroxyphenyl)propane, bis(4-hydroxyphenyl)phenylmethane, 2,2-bis(4-hydroxy-3-bromophenyl) propane, 1,1-bis (hydroxyphenyl)cyclopentane, 1,1-bis(4-hydroxyphenyl)cyclohexane, 1,1-bis(4-hydroxyphenyl)isobutene, 1,1-bis(4-hydroxyphenyl)cyclododecane, trans-2,3-bis(4-hydroxyphenyl)-2-butene, 2,2-bis(4-hydroxyphenyl)adamantine, (alpha, alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl) propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis(4-hydroxyphenyl)ether, bis(4-hydroxyphenyl)ether, bis(4-hydroxyphenyl)sulfide, bis(4-hydroxyphenyl)sulfoxide, bis(4-hydroxyphenyl)sulfone, 9,9-bis(4-hydroxyphenyl)fluorene, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole, resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone, and the like, as well as combinations comprising at least one of the foregoing dihydroxy compounds.

Specific examples of bisphenol compounds that may be represented by formula (3) include 1,1-bis(4-hydroxyphenyl) methane, 1,1-bis(4-hydroxyphenyl) ethane, 2,2-bis(4-hydroxyphenyl) propane (hereinafter "bisphenol-A" or "BPA"), 2,2-bis(4-hydroxyphenyl) butane, 2,2-bis(4-hydroxyphenyl) octane, 1,1-bis(4-hydroxyphenyl) propane, 1,1-bis(4-hydroxyphenyl) n-butane, 2,2-bis(4-hydroxy-1-methylphenyl) propane, 1,1-bis(4-hydroxy-t-butylphenyl) propane, 3,3-bis (4-hydroxyphenyl) phthalimidine, 2-phenyl-3,3-bis(4-hydroxyphenyl) phthalimidine (PPPBP), and 1,1-bis(4-hydroxy-3-methylphenyl)cyclohexane (DMBPC). Combinations comprising at least one of the foregoing dihydroxy compounds may also be used.

In specific embodiments, the polycarbonate resin is a linear homopolymer derived from bisphenol-A, in which each of A1 and A2 is p-phenylene and Y1 is isopropylidene. The polycarbonates may have an intrinsic viscosity, as determined in chloroform at 25° C., of from about 0.3 to about 1.5 deciliters per gram (dl/g), specifically from about 0.45 to about 1.0 dl/g. The polycarbonates may have a weight average molecular weight (Mw) of from about 10,000 to about 100,000, as measured by gel permeation chromatography (GPC) using a crosslinked styrene-divinyl benzene column, at a sample concentration of 1 milligram per milliliter, and as calibrated with polycarbonate standards.

In an embodiment, the polycarbonate has a melt volume flow rate (often abbreviated MVR). The MVR measures the rate at which a thermoplastic passes vertically through a capillary under a defined weight load. The MVR is measured in cubic cm per 10 minutes (cc/10 min). Polycarbonates useful for the formation of thin articles may have an MVR, measured at 300° C. under a load of 1.2 kg according to ASTM D1238-04, of from about 0.5 to about 80 cubic centimeters per 10 minutes (cc/10 min). In a specific embodiment, a useful polycarbonate composition has an MVR measured at 300° C. under a load of 1.2 kg according to ASTM D1238-04, of from about 0.5 to about 50 cc/10 min, specifically from about 0.5 to about 25 cc/10 min, and more specifically from about 1 to about 15 cc/10 min. Mixtures of polycarbonates of different flow properties may be used to achieve the overall desired flow property.

"Polycarbonates" and "polycarbonate resins" as used herein further include homopolycarbonates, copolymers comprising different $R^1$ moieties in the carbonate (referred to herein as "copolycarbonates"), copolymers comprising carbonate units and other types of polymer units, such as ester units, polysiloxane units, and combinations comprising at least one of homopolycarbonates and copolycarbonates. As used herein, "combination" is inclusive of blends, mixtures, alloys, reaction products, and the like. A specific type of copolymer is a polyester carbonate, also known as a polyester-polycarbonate. Such copolymers further contain, in addition to recurring carbonate chain units of the formula (1), repeating units of formula (8):

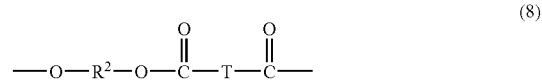

(8)

wherein $R^2$ is a divalent group derived from a dihydroxy compound, and may be, for example, a $C_{2-10}$ alkylene group, a $C_{6-20}$ alicyclic group, a $C_{6-20}$ aromatic group or a polyoxyalkylene group in which the alkylene groups contain 2 to about 6 carbon atoms, specifically 2, 3, or 4 carbon atoms; and T divalent group derived from a dicarboxylic acid, and may be, for example, a $C_{2-10}$ alkylene group, a $C_{6-20}$ alicyclic group, a $C_{6-20}$ alkyl aromatic group, or a $C_{6-20}$ aromatic group.

In an embodiment, $R^2$ is a $C_{2-30}$ alkylene group having a straight chain, branched chain, or cyclic (including polycyclic) structure. In another embodiment, $R^2$ is derived from an aromatic dihydroxy compound of formula (4) above. In another embodiment, $R^2$ is derived from an aromatic dihydroxy compound of formula (7) above.

Examples of aromatic dicarboxylic acids that may be used to prepare the polyester units include isophthalic or terephthalic acid, 1,2-di(p-carboxyphenyl)ethane, 4,4'-dicarboxydiphenyl ether, 4,4'-bisbenzoic acid, and combinations comprising at least one of the foregoing acids. Acids containing fused rings can also be present, such as in 1,4-, 1,5-, or 2,6-naphthalenedicarboxylic acids. Specific dicarboxylic acids are terephthalic acid, isophthalic acid, naphthalene dicarboxylic acid, cyclohexane dicarboxylic acid, or combinations thereof. A specific dicarboxylic acid comprises a combination of isophthalic acid and terephthalic acid wherein the weight ratio of isophthalic acid to terephthalic acid is about 91:9 to about 2:98. In another specific embodiment, $R^2$ is a $C_{2-6}$ alkylene group and T is p-phenylene, m-phenylene, naphthalene, a divalent cycloaliphatic group, or a combination thereof. This class of polyester includes the poly(alkylene terephthalates).

Polycarbonates can be manufactured by processes such as interfacial polymerization and melt polymerization. Although the reaction conditions for interfacial polymerization may vary, an exemplary process generally involves dissolving or dispersing a dihydric phenol reactant in aqueous caustic soda or potash, adding the resulting mixture to a suitable water-immiscible solvent medium, and contacting the reactants with a carbonate precursor in the presence of a catalyst such as triethylamine or a phase transfer catalyst, under controlled pH conditions, e.g., about 8 to about 10. The most commonly used water immiscible solvents include methylene chloride, 1,2-dichloroethane, chlorobenzene, toluene, and the like.

Carbonate precursors include, for example, a carbonyl halide such as carbonyl bromide or carbonyl chloride, or a haloformate such as a bishaloformates of a dihydric phenol (e.g., the bischloroformates of bisphenol-A, hydroquinone, or the like) or a glycol (e.g., the bishaloformate of ethylene glycol, neopentyl glycol, polyethylene glycol, or the like). Combinations comprising at least one of the foregoing types of carbonate precursors may also be used. In an exemplary embodiment, an interfacial polymerization reaction to form carbonate linkages uses phosgene as a carbonate precursor, and is referred to as a phosgenation reaction.

Among the phase transfer catalysts that may be used are catalysts of the formula $(R^3)_4Q^+X$, wherein each $R^3$ is the same or different, and is a $C_{1-10}$ alkyl group; Q is a nitrogen or phosphorus atom; and X is a halogen atom or a $C_{1-8}$ alkoxy group or $C_{6-18}$ aryloxy group. Useful phase transfer catalysts include, for example, $[CH_3(CH_2)_3]_4NX$, $[CH_3(CH_2)_3]_4PX$, $[CH_3(CH_2)_5]_4NX$, $[CH_3(CH_2)_6]_4NX$, $[CH_3(CH_2)_4]_4NX$, $CH_3[CH_3(CH_2)_3]_3NX$, and $CH_3[CH_3(CH_2)_2]_3NX$, wherein X is Cl$^-$, Br$^-$, a $C_{1-8}$ alkoxy group or a $C_{6-18}$ aryloxy group. An effective amount of a phase transfer catalyst may be about 0.1% by weight to about 10% by weight based on the weight of bisphenol in the phosgenation mixture. In another embodiment an effective amount of phase transfer catalyst may be about 0.5% by weight to about 2% by weight based on the weight of bisphenol in the phosgenation mixture.

Branched polycarbonate blocks may be prepared by adding a branching agent during polymerization. These branching agents include polyfunctional organic compounds containing at least three functional groups selected from hydroxyl, carboxyl, carboxylic anhydride, haloformyl, and mixtures of the foregoing functional groups. Specific examples include trimellitic acid, trimellitic anhydride, trimellitic trichloride, tris-p-hydroxy phenyl ethane, isatin-bis-phenol, tris-phenol TC (1,3,5-tris((p-hydroxyphenyl)isopropyl)benzene), tris-phenol PA (4(4(1,1-bis(p-hydroxyphenyl)-ethyl) alpha, alpha-dimethyl benzyl) phenol), 4-chloroformyl phthalic anhydride, trimesic acid, and benzophenone tetracarboxylic acid. The branching agents may be added at a level of about 0.05% by weight to about 2.0% by weight. Mixtures comprising linear polycarbonates and branched polycarbonates may be used.

A chain stopper (also referred to as a capping agent) may be included during polymerization. The chain stopper controls molecular weight in the polycarbonate. Exemplary chain stoppers include certain mono-phenolic compounds, mono-carboxylic acid chlorides, and/or mono-chloroformates. Mono-phenolic chain stoppers are exemplified by monocyclic phenols such as phenol and $C_1$-$C_{22}$ alkyl-substituted phenols such as p-cumyl-phenol, resorcinol monobenzoate, and p-and tertiary-butyl phenol; and monoethers of diphenols, such as p-methoxyphenol. Alkyl-substituted phenols with branched chain alkyl substituents having 8 to 9 carbon atom may be specifically mentioned. Certain mono-phenolic UV absorbers may also be used as a capping agent, for example 4-substituted-2-hydroxybenzophenones and their derivatives, aryl salicylates, monoesters of diphenols such as resorcinol monobenzoate, 2-(2-hydroxyaryl)-benzotriazoles and their derivatives, 2-(2-hydroxyaryl)-1,3,5-triazines and their derivatives, and the like.

Mono-carboxylic acid chlorides may also be used as chain stoppers. These include monocyclic, mono-carboxylic acid chlorides such as benzoyl chloride, $C_1$-$C_{22}$ alkyl-substituted benzoyl chloride, toluoyl chloride, halogen-substituted benzoyl chloride, bromobenzoyl chloride, cinnamoyl chloride, 4-nadimidobenzoyl chloride, and combinations thereof; polycyclic, mono-carboxylic acid chlorides such as trimellitic anhydride chloride, and naphthoyl chloride; and combinations of monocyclic and polycyclic mono-carboxylic acid chlorides. Chlorides of aliphatic monocarboxylic acids with less than or equal to about 22 carbon atoms are useful. Functionalized chlorides of aliphatic monocarboxylic acids, such as acryloyl chloride and methacryoyl chloride, are also useful. Also useful are mono-chloroformates including monocyclic, mono-chloroformates, such as phenyl chloroformate, alkyl-substituted phenyl chloroformate, p-cumyl phenyl chloroformate, toluene chloroformate, and combinations thereof.

Alternatively, melt processes may be used to make the polycarbonates. Generally, in the melt polymerization process, polycarbonates may be prepared by co-reacting, in a molten state, the dihydroxy reactant(s) and a diaryl carbonate ester, such as diphenyl carbonate, in the presence of a transesterification catalyst in a Banbury® mixer, twin screw extruder, or the like to form a uniform dispersion. Volatile monohydric phenol is removed from the molten reactants by distillation and the polymer is isolated as a molten residue. A specifically useful melt process for making polycarbonates uses a diaryl carbonate ester having electron-withdrawing substituents on the aryls. Examples of specifically useful diaryl carbonate esters with electron withdrawing substituents include bis(4-nitrophenyl)carbonate, bis(2-chlorophenyl)carbonate, bis(4-chlorophenyl)carbonate, bis(methyl salicyl)carbonate, bis(4-methylcarboxylphenyl) carbonate, bis(2-acetylphenyl) carboxylate, bis(4-acetylphenyl) carboxylate, or a combination comprising at least one of the foregoing. In addition, transesterification catalysts for use may include phase transfer catalysts of formula $(R^3)_4Q^+X$ above, wherein each $R^3$, Q, and X are as defined above. Examples of transesterification catalysts include tetrabutylammonium hydroxide, methyltributylammonium hydroxide, tetrabutylammonium acetate, tetrabutylphosphonium hydroxide, tetrabutylphosphonium acetate, tetrabutylphosphonium phenolate, or a combination comprising at least one of the foregoing. Melt processes are generally carried out in a series of stirred tank reactors. The reaction can be carried out by either a batch mode or a continuous mode. The apparatus in which the reaction is carried out can be any suitable tank, tube, or column. Continuous processes usually involve the use of one or more continuous-stirred tank reactors (CSTRs) and one or more finishing reactors.

Polyester-polycarbonates may also be prepared by interfacial polymerization. Rather than utilizing the dicarboxylic acid per se, it is possible, and sometimes even preferred, to employ the reactive derivatives of the acid, such as the corresponding acid halides, in particular the acid dichlorides and the acid dibromides. Thus, for example instead of using isophthalic acid, terephthalic acid, or a combination comprising at least one of the foregoing, it is possible to employ isophthaloyl dichloride, terephthaloyl dichloride, and a combination comprising at least one of the foregoing.

In addition to the polycarbonates described above, combinations of the polycarbonate with other thermoplastic polymers, for example combinations of homopolycarbonates and/or polycarbonate copolymers with polyesters, may be used. Useful polyesters may include, for example, polyesters having repeating units of formula (8), which include poly(alkylene dicarboxylates), liquid crystalline polyesters, and polyester copolymers. The polyesters described herein are generally completely miscible with the polycarbonates when blended.

The polyesters may be obtained by interfacial polymerization or melt-process condensation as described above, by solution phase condensation, or by transesterification polymerization wherein, for example, a dialkyl ester such as dimethyl terephthalate may be transesterified with ethylene glycol using acid catalysis, to generate poly(ethylene terephthalate). It is possible to use a branched polyester in which a branching agent, for example, a glycol having three or more hydroxyl groups or a trifunctional or multifunctional carboxylic acid has been incorporated. Furthermore, it is sometime desirable to have various concentrations of acid and hydroxyl end groups on the polyester, depending on the ultimate end use of the composition.

Useful polyesters may include aromatic polyesters, poly(alkylene esters) including poly(alkylene arylates), and poly(cycloalkylene diesters). Aromatic polyesters may have a polyester structure according to formula (8), wherein D and T are each aromatic groups as described hereinabove. In an embodiment, useful aromatic polyesters may include, for example, poly(isophthalate-terephthalate-resorcinol) esters, poly(isophthalate-terephthalate-bisphenol-A) esters, poly[(isophthalate-terephthalate-resorcinol) ester-co-(isophthalate-terephthalate-bisphenol-A)] ester, or a combination comprising at least one of these. Also contemplated are aromatic polyesters with a minor amount, e.g., about 0.5% by weight to about 10% by weight, based on the total weight of the polyester, of units derived from an aliphatic diacid and/or an aliphatic polyol to make copolyesters. Poly(alkylene arylates) may have a polyester structure according to formula (8), wherein T comprises groups derived from aromatic dicarboxylates, cycloaliphatic dicarboxylic acids, or derivatives thereof. Examples of specifically useful T groups include 1,2-, 1,3-, and 1,4-phenylene; 1,4- and 1,5-naphthylenes; cis- or trans-1,4-cyclohexylene; and the like. Specifically, where T is 1,4-phenylene, the poly(alkylene arylate) is a poly(alkylene terephthalate). In addition, for poly(alkylene arylate), specifically useful alkylene groups D include, for example, ethylene, 1,4-butylene, and bis-(alkylene-disubstituted cyclohexane) including cis-and/or trans-1,4-(cyclohexylene) dimethylene. Examples of poly(alkylene terephthalates) include poly(ethylene terephthalate) (PET), poly(1,4-butylene terephthalate) (PBT), and poly(propylene terephthalate) (PPT). Also useful are poly(alkylene naphthoates), such as poly(ethylene naphthanoate) (PEN), and poly(butylene naphthanoate) (PBN). A useful poly(cycloalkylene diester) is poly(cyclohexanedimethylene terephthalate) (PCT). Combinations comprising at least one of the foregoing polyesters may also be used.

Copolymers comprising alkylene terephthalate repeating ester units with other ester groups may also be useful. Useful ester units may include different alkylene terephthalate units, which can be present in the polymer chain as individual units, or as blocks of poly(alkylene terephthalates). Specific examples of such copolymers include poly(cyclohexanedimethylene terephthalate)-co-poly(ethylene terephthalate), abbreviated as PETG where the polymer comprises greater than or equal to 50 mol % of poly(ethylene terephthalate), and abbreviated as PCTG where the polymer comprises greater than 50 mol % of poly(1,4-cyclohexanedimethylene terephthalate).

Poly(cycloalkylene diester)s may also include poly(alkylene cyclohexanedicarboxylate)s. Of these, a specific example is poly(1,4-cyclohexane-dimethanol-1,4-cyclohexanedicarboxylate) (PCCD), having recurring units of formula (9):

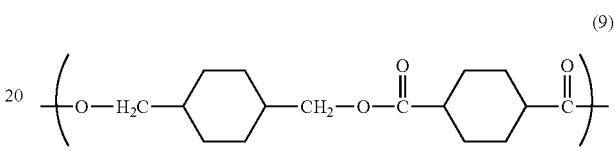

wherein, as described using formula (8), $R^2$ is a 1,4-cyclohexanedimethylene group derived from 1,4-cyclohexanedimethanol, and T is a cyclohexane ring derived from cyclohexanedicarboxylate or a chemical equivalent thereof, and may comprise the cis-isomer, the trans-isomer, or a combination comprising at least one of the foregoing isomers.

The polyester-polycarbonates may have a weight-averaged molecular weight (Mw) of from about 1,500 to about 100,000, specifically from about 1,700 to about 50,000, and more specifically from about 2,000 to about 40,000. Molecular weight determinations are performed using gel permeation chromatography (GPC), using a crosslinked styrene-divinylbenzene column and calibrated to polycarbonate references. Samples are prepared at a concentration of about 1 mg/ml, and are eluted at a flow rate of about 1.0 ml/min.

Where used, it is desirable for a polyester-polycarbonate to have an MVR of about 5 to about 150 cc/10 min., specifically about 7 to about 125 cc/10 min, more specifically about 9 to about 110 cc/10 min, and still more specifically about 10 to about 100 cc/10 min., measured at 300° C. and a load of 1.2 kilograms according to ASTM D1238-04. Commercial polyester blends with polycarbonate are marketed under the trade name XYLEX®, including for example XYLEX® X7300, and commercial polyester-polycarbonates are marketed under the tradename LEXAN® SLX polymers, including for example LEXAN® SLX-9000, and are available from GE Plastics.

The polycarbonate may be a polysiloxane-polycarbonate copolymer, also referred to as a polysiloxane-polycarbonate. The polysiloxane (also referred to herein as "polydiorganosiloxane") blocks of the copolymer comprise repeating siloxane units (also referred to herein as "diorganosiloxane units") of formula (10):

wherein each occurrence of R is same or different, and is a $C_{1-13}$ monovalent organic radical. For example, R may independently be a $C_1$-$C_{13}$ alkyl group, $C_1$-$C_{13}$ alkoxy group, $C_2$-$C_{13}$ alkenyl group, $C_2$-$C_{13}$ alkenyloxy group, $C_3$-$C_6$ cycloalkyl group, $C_3$-$C_6$ cycloalkoxy group, $C_6$-$C_{14}$ aryl group, $C_6$-$C_{10}$ aryloxy group, $C_7$-$C_{13}$ arylalkyl group, $C_7$-$C_{13}$ arylalkoxy group, $C_7$-$C_{13}$ alkylaryl group, or $C_7$-$C_{13}$ alkylaryloxy group. The foregoing groups may be fully or partially halogenated with fluorine, chlorine, bromine, or iodine, or a combination thereof. Combinations of the foregoing R groups may be used in the same copolymer.

The value of D in formula (10) may vary widely depending on the type and relative amount of each component in the polymer, the desired properties of the polymer, and like considerations. Generally, D may have an average value of 2 to 1,000, specifically 2 to 500, and more specifically 5 to 100. In one embodiment, D has an average value of 10 to 75, and in still another embodiment, D has an average value of 40 to 60.

A combination of a first and a second (or more) polysiloxane-polycarbonate copolymer may be used, wherein the average value of D of the first copolymer is less than the average value of D of the second copolymer.

In one embodiment, the polydiorganosiloxane blocks are provided by repeating structural units of formula (11):

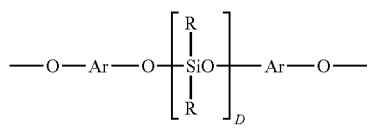

(11)

wherein D is as defined above; each R may independently be the same or different, and is as defined above; and each Ar may independently be the same or different, and is a substituted or unsubstituted $C_6$-$C_{30}$ arylene radical, wherein the bonds are directly connected to an aromatic moiety. Useful Ar groups in formula (11) may be derived from a $C_6$-$C_{30}$ dihydroxyarylene compound, for example a dihydroxyarylene compound of formula (3), (4), or (7) above. Combinations comprising at least one of the foregoing dihydroxyarylene compounds may also be used. Specific examples of dihydroxyarylene compounds are 1,1-bis(4-hydroxyphenyl) methane, 1,1-bis(4-hydroxyphenyl) ethane, 2,2-bis(4-hydroxyphenyl) propane, 2,2-bis(4-hydroxyphenyl) butane, 2,2-bis(4-hydroxyphenyl) octane, 1,1-bis(4-hydroxyphenyl) propane, 1,1-bis(4-hydroxyphenyl) n-butane, 2,2-bis(4-hydroxy-1-methylphenyl) propane, 1,1-bis(4-hydroxyphenyl) cyclohexane, bis(4-hydroxyphenyl sulphide), and 1,1-bis(4-hydroxy-t-butylphenyl) propane. Combinations comprising at least one of the foregoing dihydroxy compounds may also be used.

Units of formula (11) may be derived from the corresponding dihydroxy compound of formula (12):

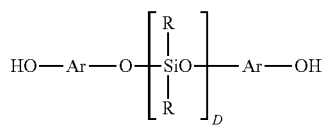

(12)

wherein R, Ar, and D are as described above. Compounds of formula (12) may be obtained by the reaction of a dihydroxyarylene compound with, for example, an alpha, omega-bisacetoxypolydiorganosiloxane under phase transfer conditions.

In another embodiment, polydiorganosiloxane blocks comprise units of formula (13):

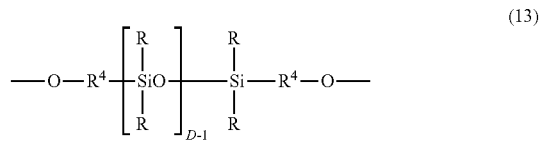

(13)

wherein R and D are as described above, and each occurrence of $R^4$ is independently a divalent $C_1$-$C_{30}$ alkylene, and wherein the polymerized polysiloxane unit is the reaction residue of its corresponding dihydroxy compound. In a specific embodiment, the polydiorganosiloxane blocks are provided by repeating structural units of formula (14):

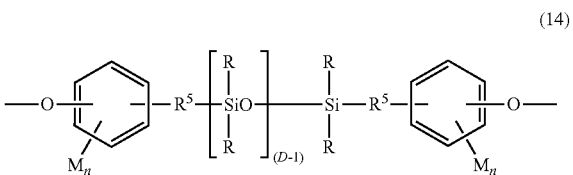

(14)

wherein R and D are as defined above. Each $R^5$ in formula (14) is independently a divalent $C_2$-$C_8$ aliphatic group. Each M in formula (14) may be the same or different, and may be a halogen, cyano, nitro, $C_1$-$C_8$ alkylthio, $C_1$-$C_8$ alkyl, $C_1$-$C_8$ alkoxy, $C_2$-$C_8$ alkenyl, $C_2$-$C_8$ alkenyloxy group, $C_3$-$C_8$ cycloalkyl, $C_3$-$C_8$ cycloalkoxy, $C_6$-$C_{10}$ aryl, $C_6$-$C_{10}$ aryloxy, $C_7$-$C_{12}$ arylalkyl, $C_7$-$C_{12}$ arylalkoxy, $C_7$-$C_{12}$ alkylaryl, or $C_7$-$C_{12}$ alkylaryloxy, wherein each n is independently 0, 1, 2, 3, or 4.

In one embodiment, M is bromo or chloro, an alkyl group such as methyl, ethyl, or propyl, an alkoxy group such as methoxy, ethoxy, or propoxy, or an aryl group such as phenyl, chlorophenyl, or tolyl; $R^5$ is a dimethylene, trimethylene or tetramethylene group; and R is a $C_{1-8}$ alkyl, haloalkyl such as trifluoropropyl, cyanoalkyl, or aryl such as phenyl, chlorophenyl or tolyl. In another embodiment, R is methyl, or a mixture of methyl and trifluoropropyl, or a mixture of methyl and phenyl. In still another embodiment, M is methoxy, n is one, $R^5$ is a divalent $C_1$-$C_3$ aliphatic group, and R is methyl.

Units of formula (14) may be derived from the corresponding dihydroxy polydiorganosiloxane (15):

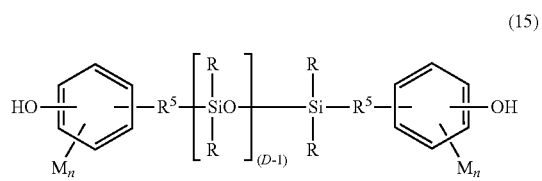

(15)

wherein R, D, M, $R^5$, and n are as described above. Such dihydroxy polysiloxanes can be made by effecting a platinum catalyzed addition between a siloxane hydride of formula (16):

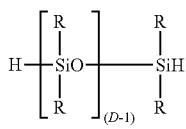

(16)

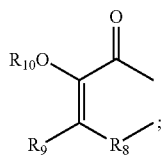

wherein R and D are as previously defined, and an aliphatically unsaturated monohydric phenol. Useful aliphatically unsaturated monohydric phenols included, for example, eugenol, 2-allylphenol, 4-allyl-2-methylphenol, 4-allyl-2-phenylphenol, 4-allyl-2-bromophenol, 4-allyl-2-t-butoxyphenol, 4-phenyl-2-phenylphenol, 2-methyl-4-propylphenol, 2-allyl-4,6-dimethylphenol, 2-allyl-4-bromo-6-methylphenol, 2-allyl-6-methoxy-4-methylphenol and 2-allyl-4,6-dimethylphenol. Mixtures comprising at least one of the foregoing may also be used.

In an embodiment, the polysiloxane-polycarbonate may comprise polysiloxane units, and carbonate units derived from bisphenol-A, e.g., the dihydroxy compound of formula (3) in which each of A1 and A2 is p-phenylene and Y1 is isopropylidene. Polysiloxane-polycarbonates may have a weight average molecular weight of 2,000 to 100,000, specifically 5,000 to 50,000 as measured by gel permeation chromatography using a crosslinked styrene-divinyl benzene column, at a sample concentration of 1 milligram per milliliter, and as calibrated with polycarbonate standards.

The polysiloxane-polycarbonate can have a melt volume flow rate, measured at 300° C. under a load of 1.2 kg, of 1 to 50 cubic centimeters per 10 minutes (cc/10 min), specifically 2 to 30 cc/10 min. Mixtures of polysiloxane-polycarbonates of different flow properties may be used to achieve the overall desired flow property. In an embodiment, exemplary polysiloxane-polycarbonates are marketed under the trade name LEXAN® EXL polycarbonates, available from GE Plastics.

The polycarbonate resin may be transparent or opaque. The polycarbonate resin may generally be any initial color. The polycarbonate resin may be either a homopolymer or a blend of polycarbonate homopolymers.

The polycarbonate composition further comprises a 3-hydroxychromone dye of Formula (I):

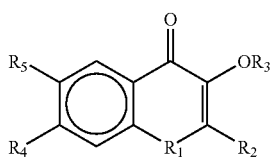

Formula (I)

wherein $R_4$ and $R_5$ are either:
(i) independently selected from the group consisting of an aliphatic radical having 1 to 12 carbon atoms, an aromatic radical having 3 to 20 carbon atoms, a cycloaliphatic radical having 3 to 12 carbon atoms, a cyano group, a nitro group, a halo group, and a —$OR_7$ group, wherein $R_7$ is selected from the group consisting of hydrogen, an aliphatic radical having 1 to 12 carbon atoms, an aromatic radical having 3 to 20 carbon atoms, and a cycloaliphatic radical having 3 to 12 carbon atoms; or
(ii) together represent an aromatic radical having 3 to 12 carbon atoms, a heteroaromatic radical having 3 to 12 carbon atoms, or a pyranone radical of the formula wherein $R_1$ and $R_8$ are independently selected from —O— or —$NR_6$—;
$R_2$ and $R_9$ are independently selected from the group consisting of an aromatic radical having 3 to 30 carbon atoms, and a cycloaliphatic radical having 3 to 12 carbon atoms;
$R_3$ and $R_{10}$ are independently selected from hydrogen or a labile group with the proviso that $R_3$ is not a group selected from the group consisting of —$CH_2$—$(CH_2)_n$—$CH_3$ and —$CH_2$—$C_6H_5$ wherein n has a value 0, 1, or 2; and
$R_6$ is selected from the group consisting of hydrogen, an aliphatic radical having 1 to 12 carbon atoms, an aromatic radical having 3 to 20 carbon atoms, and a cycloaliphatic radical having 3 to 12 carbon atoms.

In embodiments, the dye of Formula (I) is present in the amount of from about 0.001 parts to about 0.05 parts per hundred parts resin (phr). In specific embodiments, $R_1$ is —O— and $R_3$ is hydrogen, so that the resulting dye is a 3-hydroxychromone dye.

In specific embodiments, $R_1$ is —O—, $R_2$ is biphenyl, and $R_3$, $R_4$, and $R_5$ are hydrogen. Then, the dye of Formula (I) is BP-3-HF. BP-3-HF has an absorption maximum at 355 nm and an emission maximum at 546 nm.

In other specific embodiments, $R_1$ is —O—, $R_2$ is phenyl, $R_3$ is hydrogen, and $R_4$ and $R_5$ together represent the pyranone radical structure where $R_8$ is —O—, $R_9$ is phenyl, and $R_{10}$ is hydrogen. Then, the dye of Formula (I) is D-3-HF.

The dye of Formula (I) may also be a chemically protected 3-hydroxychromone dye. The labile moiety $R_3$ is generally any labile moiety that can be at least partially or totally disassociated or deblocked as a result of exposure to heat and/or photo and/or chemical stimulus, so that $R_3$ becomes hydrogen. Illustrative examples of suitable labile moieties for $R_3$ include those selected from the group consisting of —COOR', —$CH_2R'$, —$SO_2R'$, —COR', —CSR', —Si(R')$_3$ and —CON(R")$_2$; wherein each R' is independently selected from the group consisting of an aliphatic radical having 1 to 12 carbon atoms, a cycloaliphatic radical having 3 to 20 carbon atoms, and an aromatic radical having 3 to 20 carbon atoms and wherein each R" is independently selected from the group consisting of hydrogen, an aliphatic radical having 1 to 12 carbon atoms, a cycloaliphatic radical having 3 to 20 carbon atoms, and an aromatic radical having 3 to 20 carbon atoms, with the proviso that $R_3$ is not a group selected from the group consisting of —$CH_2$—$(CH_2)_n$—$CH_3$ and —$CH_2$—$C_6H_5$ wherein n has a value 0, 1 or 2. In one embodiment the labile moiety $R_3$, is selected from the group consisting of —COOR', —$CH_2R'$, —$SO_2R'$ and —COR', wherein R' has the same meaning as defined above. In exemplary embodiments, the labile moiety $R_3$ is selected from the group consisting of —COOR' and —$CH_2R'$ wherein R' is as defined above, with the proviso that $R_3$ is not a group selected from the group consisting of —$CH_2$—$(CH_2)_n$—$CH_3$ and —$CH_2$-$C_6H_5$ wherein n has a value of 0, 1, or 2. Of course, this discussion relating to $R_3$ also relates to $R_{10}$ when $R_4$ and $R_5$ together form a pyranone radical.

The polycarbonate composition further comprises an ultraviolet absorber selected from the group consisting of cyanoacrylates, malonates, and oxanilides. Cyanoacrylates have as part of their structure the general formula:

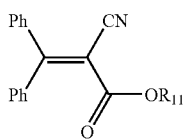

wherein $R_{11}$ is selected from alkyl having 1 to 8 carbon atoms or hydroxyalkyl having 1 to 6 carbon atoms.

Exemplary cyanoacrylate UV absorbers include 1,3-bis-[(2'-cyano-3',3'-diphenylacryloyl)oxy]-2,2-bis-{[(2'-cyano-3',3'-diphenylacryloyl)oxy]methyl}-propane, commercially available as Uvinul® 3030 from BASF; ethyl-2-cyano-3,3-diphenylacrylate, commercially available as Uvinul® 3035 from BASF; (2-ethylhexyl)-2-cyano-3,3-diphenylacrylate, commercially available as Uvinul® 3039 from BASF; and (2-hydroxyethyl)-2-cyano-3,3-diphenylacrylate, commercially available as Uvinul® X-21 from BASF. Their chemical structures are also shown below:

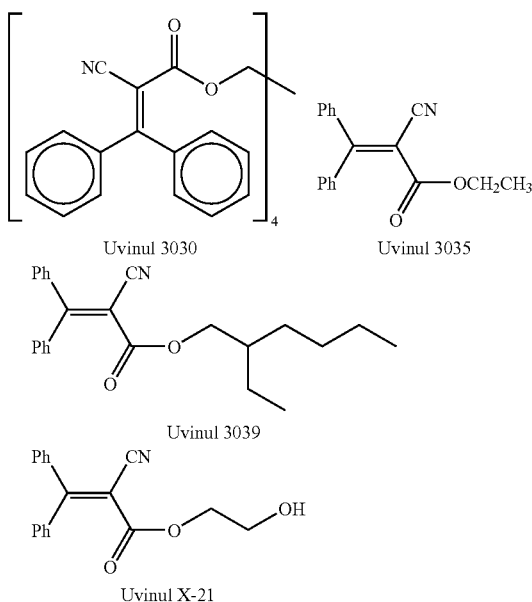

Malonates have the general formula

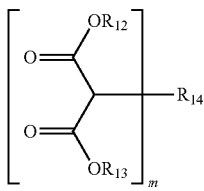

wherein $R_{12}$ and $R_{13}$ are independently selected from hydrogen, alkyl, substituted alkyl, and aryl; $R_{14}$ is selected from hydrogen and aromatic radicals; and m is an integer from 1 to 4. $R_{14}$ should be construed as allowing for a double bond to be attached to the middle carbon of the malonate structure (i.e. the non-carboxylic carbon).

In specific embodiments, the malonate UV absorber is tetraethyl-2,2'-(1,4-phenylene-dimethylidene)-bismalonate, having the formula:

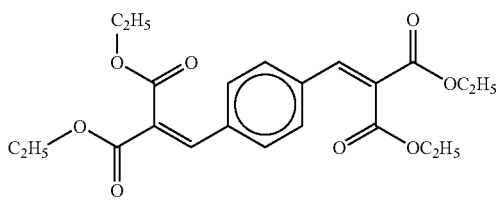

This bis(benzylidene) malonate is commercially available as Hostavin® B-CAP®, from Clariant. In other specific embodiments, the malonate UV absorber is propanedioic acid [(4-methoxyphenyl)methylene]dimethyl ester, having the formula:

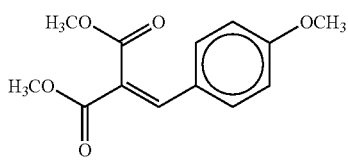

This malonate is commercially available as Hostavin® PR-25 (CAS # 7443-25-6) from Clariant.

Oxanilides have the general formula

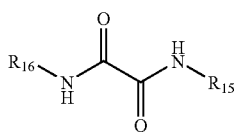

where $R_{15}$ and $R_{16}$ independently represent aryl groups substituted with at least one of alkyl having 1 to 12 carbon atoms or alkoxy having 1 to 8 carbon atoms.

Exemplary oxanilides include 2-ethyl-2'-ethoxy-oxanilide, commercially available as Sanduvor® VSU from Clariant or Tinuvin® 312 from Ciba; 2-ethyl-2'-ethoxy-5'-tert-butyl-oxanilide, commercially available as Sanduvor® EPU from Clariant or Tinuvin® 315 from Ciba; and 4-(1-methylundecyl)-2'-ethoxy-oxanilide, commercially available as Sanduvor® 3212 from Clariant. Their chemical structures are also shown below:

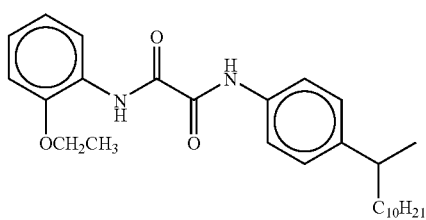

Sanduvor 3206

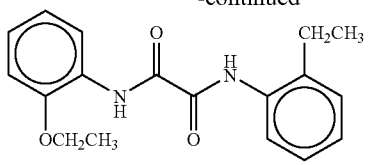

Sanduvor VSU

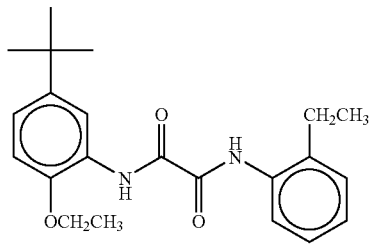

Sanduvor EPU

In more specific embodiments, the UV absorber is a malonate or cyanoacrylate. Combinations of malonates, cyanoacrylates, and oxanilides may also be used in the polycarbonate composition. Additionally, one or more of the malonates, cyanoacrylate and/or oxanilides may be used in combination with small amounts of other UV absorbers, such as benzotriazoles and benzophenones, so long the required fluorescence emission intensity is obtained.

The UV absorber may be present in the polycarbonate composition in amounts of from about 0.1 phr to about 5.0 phr. In more specific embodiments, the UV absorber is present in the amount of from about 0.3 phr to about 1.0 phr. The loading level of the UV absorber is critical to achieve both good color retention and strong fluorescent emission intensity.

The ratio of dye to UV absorber can be important. Higher ratios of dye to UV absorber have greater photoyellowing upon exposure, but also have higher initial fluorescence intensity.

The polycarbonate composition is generally clear. However, if desired, the polycarbonate composition may further comprise a colorant to change its color. The colorant may be any dye, pigment, or quantum dot which imparts color to the composition and does not adversely affect the fluorescent properties of the dye of Formula (I). Useful organic pigments and dyes include acridine dyes, aminoketone dyes, anthracene derivatives, anthraquinones, aryl- or heteroaryl-substituted poly ($C_{2-8}$) olefin dyes, arylmethane dyes, azine dyes, azo dyes, azo lakes, azos, lactone dyes, lanthanide chelates, metal dithiol complexes, methine dyes, perinones, perylenes, phthalocyanines, polyazaindacenes, porphyrin dyes, pyrazolines, pyrazolones, pyrene, pyrilium, quinacridones, quinophthalones, and tetrachloroisoindolinones.

The polycarbonate composition may have a light transmittance greater than or equal to about 10% as measured using a molded article of 3.2±0.12 millimeters thickness, according to ASTM D1003-00. In other specific embodiments, the light transmittance is 20% or greater, or 50% or greater. The polycarbonate may also have a haze less than or equal to about 5% as measured using a molded article of 3.2±0.12 millimeters thickness, according to ASTM D1003-00.

The resulting polycarbonate composition has good color retention and strong initial fluorescence emission intensity. In embodiments, the composition has an initial fluorescence emission intensity greater than $10^6$ before exposure to a xenon arc source. The composition also has a total color shift dE* of about 1.2 or less after 100 hours exposure according to a modified ASTM D4459 (directed to indoors lighting). ASTM D4459 specifies a black panel temperature (BPT) of 55° C., a chamber temperature of 40° C., and a humidity of 55%. The modified ASTM D4459 uses a BPT of 63° C., a chamber temperature of 50° C., and a humidity of 50%. Other parameters are unchanged.

The composition may also have a total color shift of about 1.2 or less after 300 hours exposure according to ASTM G26 (directed towards outdoor weathering). In further specific embodiments, the composition has an initial fluorescence emission intensity of $10^6$ or greater, and a total color shift dE* of about 1.2 or less after 300 hours exposure according to ASTM G26.

The combination of the dye of Formula (I) with a cyanoacrylate, malonate, or oxanilide UV absorber is critical. In particular, benzotriazole UV absorbers were found to reduce photoyellowing, but required loading levels so high that the resulting fluorescent emission intensity was low (around $4 \times 10^5$). This may be attributable to the fact that benzotriazoles have an absorption maximum at about 340 nm, which is near the absorption maximum of 355 nm of, for example, BP-3-HF. Thus, the benzotriazole absorbed photons that would otherwise go into fluorophore excitation. Benzotriazoles were therefore incompatible with the desired properties of the polycarbonate composition when efficient fluorescence is required.

Polycarbonate compositions using cyanoacrylate UV absorbers had sufficient protection against photoyellowing and had about three times the fluorescence emission intensity of a composition using benzotriazoles (at equal weight percent UV absorber). Also, cyanoacrylates have an absorption maximum at about 300 nm. Therefore, enough photons can reach the dye to cause fluorescence.

The polycarbonate composition may further include other additives which can be incorporated with polymeric compositions, with the proviso that the additives are selected so as not to adversely affect the desired properties of the polycarbonate composition. Mixtures of additives may be used. Such additives may be mixed at a suitable time during the mixing of the components for forming the thermoplastic composition. Examples of such additives include fillers, antioxidants, heat stabilizers, light stabilizers, plasticizers, mold release agents, lubricants, antistatic agents, flame retardants, and anti-drip agents.

Thermal stabilizers may also be added to the composition to prevent degradation of the organic polymer during processing and to improve heat stability of the article. Suitable thermal stabilizers include phosphites, phosphonites, phosphines, hindered amines, hydroxyl amines, phenols, acryloyl modified phenols, hydroperoxide decomposers, benzofuranone derivatives, or the like, or combinations comprising at least one of the foregoing thermal stabilizers. Examples include, but are not limited to, phosphites such as tris(nonyl phenyl) phosphite, tris(2,4-di-t-butylphenyl) phosphite, bis (2,4-di-t-butylphenyl) pentaerythritol diphosphite, distearyl pentaerythritol diphosphite or the like; alkylated monophenols or polyphenols; alkylated reaction products of polyphenols with dienes, such as tetrakis[methylene(3,5-di-tert-butyl-4-hydroxyhydrocinnamate)] methane, or the like; butylated reaction products of paracresol or dicyclopentadiene; alkylated hydroquinones; hydroxylated thiodiphenyl ethers; alkylidene-bisphenols; benzyl compounds; esters of beta-(3,5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, ditridecylthiodipropionate, octadecyl-3-(3,5-di-tert-butyl-4-hydroxyphenyl)propionate, pentaerythrityl-tetrakis
3-(3,5-di-tert-butyl-4-hydroxyphenyl)propionate or the like; amides of beta-(3,5-di-tert-butyl-4-hydroxyphenyl)-propionic acid or the like, or combinations comprising at least one of the foregoing antioxidants. Suitable thermal stabilizers that are commercially available are IRGAPHOS™ 168, DOVERPHOS™ S-9228, ULTRANOX™ 641, Phosphite PEPQ or the like. If desirable, an optional co-stabilizer such as a aliphatic epoxy or a hindered phenol anti-oxidant such as IRGANOX™ 1076,IRGANOX™ 1010, both from Ciba Specialty chemicals may also be added to improve thermal stability of the composition. The preferred thermal stabilizers are phosphites.

The polycarbonate compositions of the present disclosure may be manufactured by methods generally available in the art. For example, in one manner of proceeding, the polycarbonate resin, dye, and UV absorber are first blended in a high speed mixer. Other low shear processes including, but not limited to, hand mixing may also accomplish this blending. The blend is then fed into the throat of an extruder via a hopper. Alternatively, the dye and/or UV absorber may be incorporated into the polycarbonate resin by feeding directly into the extruder at the throat and/or downstream through a sidestuffer. Additives may also be compounded into a masterbatch with a desired polycarbonate resin and fed into the extruder. The extruder is generally operated at a temperature higher than that necessary to cause the composition to flow. The extrudate is immediately quenched in a water batch and pelletized. The pellets, so prepared, when cutting the extrudate may be one-fourth inch long or less as desired. Such pellets may be used for subsequent molding, shaping, or forming. Articles may be molded from the polycarbonate composition by a variety of means such as injection molding, extrusion, rotational molding, blow molding and thermoforming.

The following examples are provided to illustrate the polycarbonate compositions and methods of the present disclosure. The examples are merely illustrative and are not intended to limit compositions made in accordance with the disclosure to the materials, conditions, or process parameters set forth therein.

EXAMPLES

A series of experiments were carried out to illustrate the properties of the compositions of the present disclosure. Those experiments used the following protocols and instruments.

The total color shift, CIELab dE*, was measured using a Gretag MacBeth 7000A color spectrophotometer having 10 nanometer resolution. The settings were: UV included/excluded (Table 1/Table 2), SCI, C illuminant, and 2 degree observer.

The plaques were exposed to accelerated weathering conditions according to the following modified ASTM D4459 protocol. The ATLAS weathering device was a Ci65 and had an inner filter of S-borosilicate and outer filter of soda-lime. At 340 nm, the irradiance level was 0.35 W/m$^2$ with samples exposed to continuous light. The set-point black panel temperature was 63° C., the relative humidity was controlled to approximately 50%, and the chamber temperature was 50° C.

Plaques were also exposed to accelerated weathering conditions following the ASTM G26 protocol. The ATLAS weathering device was a Ci65 and exposed samples to cycles of 102 minutes with light and 18 minutes with light and water spray combined. Ci65 had a UV cutoff near 290 nm. At 340 nm, the irradiance level was 0.35 W/m$^2$ with 30.2 kJ/24 hours. The set-point black panel temperature was 63° C. and the relative humidity was controlled to approximately 50%. Borosilicate was used for both the inner and outer filters.

Fluorescence measurements were acquired on a Spex Fluorolog 3 with a xenon lamp with detection with a photomultiplier in photon counting mode. Both excitation and emission had a double monochromator. The excitation wavelength was 365 nm.

Example 1

One control composition C1 and three test compositions E1-E3 were made. Each composition was made using the materials listed in Table 1. The amounts are listed as parts by weight. The ingredients were pre-blended, then extruded and molded under normal processing conditions.

The polycarbonate homopolymer PC-A was a high flow Bisphenol-A polycarbonate with a target molecular weight of 21,900 (based on GPC using polycarbonate standards). The polycarbonate homopolymer PC-B was a low flow Bisphenol-A polycarbonate with a target molecular weight of 29,900. The copolymer PC-C was a bisphenol-A copolycarbonate having a Mw of 23,300 and 50% comonomer. A phosphite heat stabilizer was included. Pentaerythritol tetrastearate (PETS) was used as a mold release agent. Tinuvin® 234 was used as a benzotriazole UV absorber. Uvinul® 3030 was incorporated as a cyanoacrylate UV absorber. Small amounts of three standard solvent dyes were added to give color to the composition.

The compositions included 0.02 phr of BP-3-HF and were exposed to a xenon arc lamp in accordance with the modified ASTM D4459, an interior lightfastness protocol. The thickness of the plaques was 0.125 inches. Prior to the xenon exposure, the initial fluorescence emission intensity was measured. The total color shift (CIELab dE*) at 50 hours and 100 hours were measured after exposure in the weatherometer. Results are also shown in Table 1. The fluorescence is given relative to the fluorescence of E1, the benzotriazole UV absorber.

TABLE 1

| Description | Unit | C1 | E1 | E2 | E3 |
|---|---|---|---|---|---|
| PC-A | phr | 70 | 70 | 70 | 70 |
| PC-B | phr | 30 | 30 | 30 | 30 |
| PC-C | phr | 1 | 1 | 1 | 1 |
| Phosphite | phr | 0.06 | 0.05 | 0.05 | 0.05 |
| PETS | phr | 0.3 | 0.3 | 0.3 | 0.3 |
| BP-3-HF | phr | 0.02 | 0.02 | 0.02 | 0.02 |
| Tinuvin ® 234 | phr |  | 0.5 |  |  |
| Uvinul ® 3030 | phr |  |  | 0.5 | 1.0 |
| Colorant 1 | phr | 0.0003 | 0.0003 | 0.0003 | 0.0003 |
| Colorant 2 | phr | 0.0001 | 0.0001 | 0.0001 | 0.0001 |
| Colorant 3 | phr | 0.0002 | 0.0002 | 0.0002 | 0.0002 |
| dE* @ 50 hrs |  | 4.32 | 0.52 | 1.24 | 0.88 |
| dE* @ 100 hrs |  | 4.04 | 0.63 | 1.32 | 0.94 |
| Fluorescence @ 546 nm relative to E1 |  |  | 1 | 5.23 | 3.30 |

The data showed that compared to C1, the three test compositions E1-E3 had improved lightfastness, as illustrated by the reduced dE*. This indicated that they retained their initial color better. However, E1, which contained the benzotriazole UV absorber, had significantly worse fluorescence emission intensity compared to E2 (which had equal parts UV absorber). E3 showed that higher loadings of the UV absorber still had acceptable fluorescence emission intensity. Even at these higher loadings, the initial fluorescence emission intensity was over 3× greater than that of E1.

Example 2

One control composition C4 and seven test compositions E4-E10 were formulated and exposed to light according to ASTM G26 using 0.100 inch color plaques. The control, C4, contained no BP-3-HF, while the test compositions contained 0.01 phr BP-3-HF along with a UV absorber. Polycarbonate PC-A and PC-B were used. The color shift was measured from 50 to 300 hours at various intervals. The compositions and results are shown in Table 2. Cyasorb® UV 5411 was a 2-(2'-hydroxy-5'-octylphenyl)-benzotriazole UV absorber. Hostavin® B-CAP® was a bismalonate UV absorber. ADK LA-31RG was a benzotriazole UV absorber equivalent to Tinuvin® 360. Cyasorb® UV-3638 was a benzoxazinone UV absorber.

TABLE 2

| Description | Unit | C4 | E4 | E5 | E6 | E7 | E8 | E9 | E10 |
|---|---|---|---|---|---|---|---|---|---|
| PC-A | phr | 65 | 65 | 65 | 65 | 65 | 65 | 65 | 65 |
| PC-B | phr | 35 | 35 | 35 | 35 | 35 | 35 | 35 | 35 |
| Phosphite | phr | 0.06 | 0.06 | 0.06 | 0.06 | 0.06 | 0.06 | 0.06 | 0.06 |
| BP-3-HF | phr |  | 0.01 | 0.01 | 0.01 | 0.01 | 0.01 | 0.01 | 0.01 |
| Cyasorb ® UV-5411 | phr |  |  | 0.5 |  |  |  |  |  |
| Tinuvin ® 234 | phr |  |  |  | 0.5 |  |  |  |  |
| Hostavin ® B-CAP | phr |  |  |  |  | 0.5 |  |  |  |
| Uvinul ® 3030 | phr |  |  |  |  |  | 0.5 |  |  |
| ADK LA-31RG | phr |  |  |  |  |  |  | 0.5 |  |
| Cyasorb ® UV-3638 | phr |  |  |  |  |  |  |  | 0.5 |
| dE* @ 50 hrs |  | 0.838 | 2.047 | 0.264 | 0.113 | 0.953 | 0.724 | 0.133 | 0.216 |
| dE* @ 100 hrs |  | 1.48 | 2.306 | 0.243 | 0.124 | 0.868 | 0.79 | 0.133 | 0.28 |
| dE* @ 200 hrs |  | 2.425 | 3.119 | 0.351 | 0.193 | 0.898 | 1.03 | 0.133 | 0.422 |
| dE* @ 300 hrs |  | 2.838 | 3.713 | 0.47 | 0.316 | 0.952 | 1.155 | 0.133 | 0.56 |

C4 was used to show the amount of photoyellowing due to UV degradation of the polymer, while E4 showed the amount of photoyellowing due to photoyellowing of the BP-3-HF. As seen by comparing C4 and E4, photoyellowing of the BP-3-HF was a significant portion of the color shift. All of the compositions E5-E10 reduced the amount had a good visual appearance.

Example 3

One control composition C11 and six test compositions E11-E16 were formulated and tested for initial fluorescence emission intensity. The test compositions contained 0.02 phr BP-3-HF along with a UV absorber. The compositions and results are shown in Table 3. Note that E11-E17 correspond roughly to E4-E10 respectively. The results are shown in both absolute intensity and percentage comparison to C11 (no UV absorber). FIG. 1 also shows the absolute intensity of the fluorescence emission in graphical form.

TABLE 3

| Description | Unit | C11 | E11 | E12 | E13 | E14 | E15 | E16 |
|---|---|---|---|---|---|---|---|---|
| PC-A | phr | 70 | 70 | 70 | 70 | 70 | 70 | 70 |
| PC-B | phr | 30 | 30 | 30 | 30 | 30 | 30 | 30 |
| PC-C | phr | 1 | 1 | 1 | 1 | 1 | 1 | 1 |
| Phosphite | phr | 0.06 | 0.06 | 0.06 | 0.06 | 0.06 | 0.06 | 0.06 |
| BP-3-HF | phr | 0.02 | 0.02 | 0.02 | 0.02 | 0.02 | 0.02 | 0.02 |
| PETS | phr | 0.3 | 0.3 | 0.3 | 0.3 | 0.3 | 0.3 | 0.3 |
| Cyasorb UV-5411 | phr |  | 0.5 |  |  |  |  |  |
| Tinuvin 234 | phr |  |  | 0.5 |  |  |  |  |
| Hostavin B-CAP | phr |  |  |  | 0.5 |  |  |  |
| Uvinul 3030 | phr |  |  |  |  | 0.5 |  |  |
| ADK LA-31RG | phr |  |  |  |  |  | 0.5 |  |
| Cyasorb UV-3638 | phr |  |  |  |  |  |  | 0.5 |
| Initial Fluorescence |  | 4,311,280 | 547,700 | 473,770 | 3,426,570 | 1,457,240 | 325,940 | 108,760 |
| Percent Retention of Fluorescence (unexposed samples) | % |  | 12.70% | 10.99% | 79.48% | 33.80% | 7.56% | 2.52% |

E13 and E14, which were malonate and cyanoacrylate absorbers, respectively, also maintained acceptable initial fluorescence emission intensity as well as reducing photoyellowing. This combination of properties was desirable.

Example 4

Four polycarbonate plaques were made and exposed to UV light by placing them outdoors. Control plaque C17 contained no D-3-HF. Test plaque E17 contained 0.01 phr of D-3-HF and no UV absorbers. Test plaque E18 contained 0.01 phr D-3-HF and 0.5 phr Uvinul® 3030 (cyanoacrylate). Test plaque E19 contained 0.01 phr D-3-HF and 0.5 phr Tinuvin® 234 (benzotriazole).

After just six hours exposure, E17 had very obviously shifted color to an amber appearance. C17 did not significantly shift color. E18 and E19 retained their initial color when exposed for six hours.

Plaques E18 and E19 were also tested for fluorescence prior to exposure. E18 gave a much stronger and obvious fluorescent emission compared to E19 when stimulated with UV.

These results showed that the cyanoacrylate UV absorber gave both good color retention and strong initial fluorescence.

The compositions of the present disclosure have been described with reference to exemplary embodiments. Obviously, modifications and alterations will occur to others upon reading and understanding the preceding detailed description. It is intended that the exemplary embodiments be construed as including all such modifications and alterations insofar as they come within the scope of the appended claims or the equivalents thereof.

The invention claimed is:

1. A polycarbonate composition, comprising:
a polycarbonate resin;
an ultraviolet absorber selected from the group consisting of 1,3-bis-[(2'-cyano-3',3'-diphenylacryloyl)oxy]-2,2-bis-{[(2'-cyano-3',3'-diphenylacryloyl)oxy]methyl}-propane and tetraethyl-2,2'-(1,4-phenylene-dimethylidene)-bismalonate; and
a dye of Formula (I):

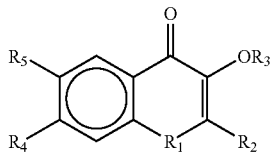

Formula (I)

wherein $R_4$ and $R_5$ are either:
(i) independently selected from the group consisting of an aliphatic radical having 1 to 12 carbon atoms, an aromatic radical having 3 to 20 carbon atoms, a cycloaliphatic radical having 3 to 12 carbon atoms, a cyano group, a nitro group, a halo group, and a —$OR_7$ group, wherein $R_7$ is selected from the group consisting of hydrogen, an aliphatic radical having 1 to 12 carbon atoms, an aromatic radical having 3 to 20 carbon atoms, and a cycloaliphatic radical having 3 to 12 carbon atoms; or
(ii) together represent an aromatic radical having 3 to 12 carbon atoms, a heteroaromatic radical having 3 to 12 carbon atoms, or a pyranone radical of the formula

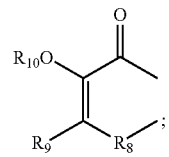

$R_1$ and $R_8$ are independently selected from —O— or —$NR_6$—;

$R_2$ and $R_9$ are independently selected from the group consisting of an aromatic radical having 3 to 30 carbon atoms, and a cycloaliphatic radical having 3 to 12 carbon atoms;

$R_3$ and $R_{10}$ are independently selected from hydrogen or a labile group with the proviso that $R_3$ is not a group selected from the group consisting of —$CH_2$—$(CH_2)_n$—$CH_3$ and —$CH_2$—$C_6H_5$ wherein n has a value 0, 1, or 2; and $R_6$ is selected from the group consisting of hydrogen, an aliphatic radical having 1 to 12 carbon atoms, an aromatic radical having 3 to 20 carbon atoms, and a cycloaliphatic radical having 3 to 12 carbon atoms.

2. The composition of claim 1, wherein the dye is selected from the group consisting of BP-3-HF, having the formula:

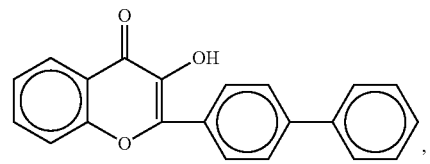

and

D-3-HF, having the formula:

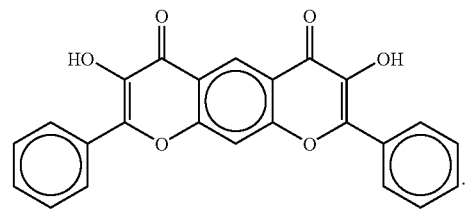

3. The composition of claim 1, wherein the dye is D-3-HF, having the formula:

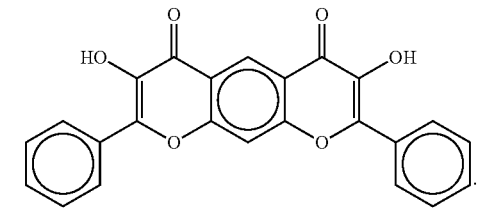

4. The composition of claim 1, wherein the dye is BP-3-HF, having the formula:

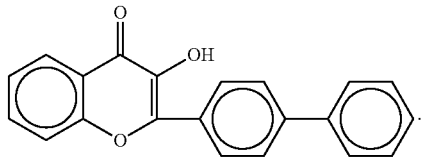

5. The composition of claim 1, wherein the ultraviolet absorber is present in the amount of from about 0.1 phr to about 5.0 phr and the dye is present in the amount of from about 0.001 phr to about 0.05 phr.

6. The composition of claim 4, wherein the ultraviolet absorber is 1,3-bis-[(2'-cyano-3',3'-diphenylacryloyl)oxy]-2,2-bis-{[(2'-cyano-3',3'-diphenylacryloyl)oxy]methyl}-propane.

7. The composition of claim 2, wherein the ultraviolet absorber is present in the amount of from about 0.1 phr to about 5.0 phr and the dye is present in the amount of from about 0.001 phr to about 0.05 phr.

8. The composition of claim 1, wherein a 0.125 inch plaque of the composition has an initial fluorescence emission intensity of $10^6$ or greater.

9. The composition of claim 1, wherein the composition has a total color shift dE* of about 1.2 or less after 100 hours exposure, according to a modified ASTM D4459.

10. The composition of claim 1, wherein the composition has a total color shift dE* of about 1.2 or less after 300 hours exposure, according to ASTM G26.

11. The composition of claim 1, wherein the composition has an initial fluorescence emission intensity of $10^6$ or greater, and a total color shift dE* of about 1.2 or less after 300 hours exposure according to ASTM G26.

12. The composition of claim 1, wherein the polycarbonate resin is a homopolymer.

13. The composition of claim 1, wherein the polycarbonate resin is a blend of polycarbonate homopolymers.

14. The composition of claim 1, wherein the composition has a light transmittance of 10% or greater at a thickness of 3.2 mm, according to ASTM D1003.

15. The composition of claim 1, wherein the composition has a haze of 5% or less at a thickness of 3.2 mm, according to ASTM D1003.

16. The composition of claim 8, wherein the composition has a total color shift dE* of about 1.2 or less after 100 hours exposure, according to a modified ASTM D4459.

17. The composition of claim 8, wherein the composition has a total color shift dE* of about 1.2 or less after 300 hours exposure, according to ASTM G26.

18. A polycarbonate composition, comprising:
a polycarbonate resin;
an ultraviolet absorber selected from the group consisting of 1,3-bis-[(2'-cyano-3',3'-diphenylacryloyl)oxy]-2,2-bis-{[(2'-cyano-3',3'-diphenylacryloyl)oxy]methyl}-propane and tetraethyl-2,2'-(1,4-phenylene-dimethylidene)-bismalonate; and
a dye selected from the group consisting of BP-3-HF and D-3-HF:

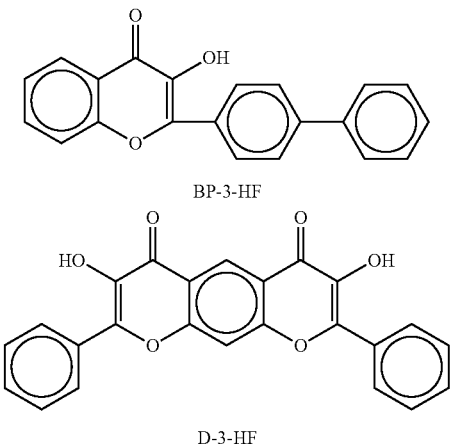

wherein the composition has a total color shift dE* of about 1.2 or less after 300 hours exposure, according to ASTM G26; and
wherein a 0.125 inch plaque of the composition has an initial fluorescence emission intensity greater than $10^6$.

19. The composition of claim 18, wherein the ultraviolet absorber is 1,3-bis-[(2'-cyano-3',3'-diphenylacryloyl)oxy]-2,2-bis-{[(2'-cyano-3',3'-diphenylacryloyl)oxy]methyl}-propane.

20. The composition of claim 19, wherein the ultraviolet absorber is present in the amount of from about 0.1 phr to about 5.0 phr.

21. The composition of claim 18, wherein the dye is BP-3-HF.

22. The composition of claim 19, wherein the due is BP-3-HF.

23. The composition of claim 22, wherein the ultraviolet absorber is present in the amount of from about 0.1 phr to about 5.0 phr.

24. A method of causing a fluorescent light emission, comprising exposing to ultraviolet light a polycarbonate composition, comprising:
a polycarbonate resin;
an ultraviolet absorber selected from the group consisting of 1,3-bis-[(2'-cyano-3',3'-diphenylacryloyl)oxy]-2,2-bis-{[(2'-cyano-3',3'-diphenylacryloyl)oxy]methyl}-propane and tetraethyl-2,2'-(1,4-phenylene-dimethylidene)-bismalonate; and
a dye of Formula (I):

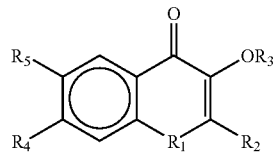

Formula (I)

wherein $R_4$ and $R_5$ are either:
(i) independently selected from the group consisting of an aliphatic radical having 1 to 12 carbon atoms, an aromatic radical having 3 to 20 carbon atoms, a cycloaliphatic radical having 3 to 12 carbon atoms, a cyano group, a nitro group, a halo group, and a —$OR_7$ group, wherein $R_7$ is selected from the group consisting of hydrogen, an aliphatic radical having 1 to 12 carbon atoms, an aromatic radical having 3 to 20 carbon atoms, and a cycloaliphatic radical having 3 to 12 carbon atoms; or (ii) together represent an aromatic radical having 3 to 12 carbon atoms, a heteroaromatic radical having 3 to 12 carbon atoms, or a pyranone radical of the formula

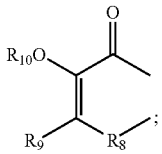

$R_1$ and $R_8$ are independently selected from —O— or —$NR_6$—;

$R_2$ and $R_9$ are independently selected from the group consisting of an aromatic radical having 3 to 30 carbon atoms, and a cycloaliphatic radical having 3 to 12 carbon atoms;

$R_3$ and $R_{10}$ are independently selected from hydrogen or a labile group with the proviso that $R_3$ is not a group selected from the group consisting of —$CH_2$—$(CH_2)_n$—$CH_3$ and —$CH_2$—$C_6H_5$ wherein n has a value 0, 1, or 2; and $R_6$ is selected from the group consisting of hydrogen, an aliphatic radical having 1 to 12 carbon atoms, an aromatic radical having 3 to 20 carbon atoms, and a cycloaliphatic radical having 3 to 12 carbon atoms.

25. The method of claim 24, wherein the dye is selected from the group consisting of BP-3-HF and D-3-HF:

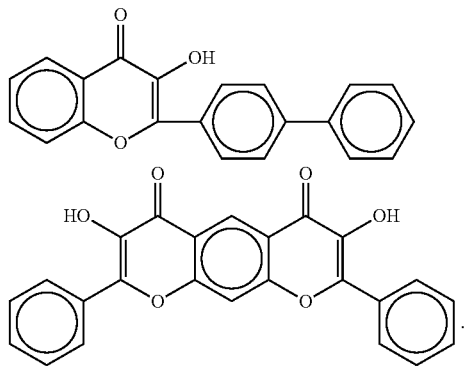

26. The method of claim 25, wherein the dye is BP-3.

27. The method of claim 25, wherein the ultraviolet absorber is 1,3-bis-[(2'-cyano-3',3'-diphenylacryloyl)oxy]-2,2-bis-{[(2'-cyano-3',3'-diphenylacryloyl)oxy]methyl}-propane.

28. The method of claim 26, wherein the ultraviolet absorber is 1,3-bis-[(2'-cyano-3',3'-diphenylacryloyl)oxy]-2,2-bis-{[(2'-cyano-3',3'-diphenylacryloyl)oxy]methyl}-propane.

29. The method of claim 25, wherein the ultraviolet absorber is present in the amount of from about 0.1 phr to about 5.0 phr.

30. The method of claim 25, wherein the ultraviolet absorber is tetraethyl-2,2'-(1,4-phenylene-dimethylidene)-bismalonate.

* * * * *